(12) United States Patent
Melton et al.

(10) Patent No.: US 9,956,724 B2
(45) Date of Patent: *May 1, 2018

(54) INSULATED DOUBLE WALLED DRINKING VESSEL AND METHOD OF MAKING THE SAME

(71) Applicant: Tervis Tumbler Company, North Venice, FL (US)

(72) Inventors: Thomas Melton, Englewood, FL (US); Thomas Fulton, Sarasota, FL (US)

(73) Assignee: Tervis Tumbler Company, North Venice, FL (US)

( * ) Notice: Subject to any disclaimer, the term of this patent is extended or adjusted under 35 U.S.C. 154(b) by 377 days.

This patent is subject to a terminal disclaimer.

(21) Appl. No.: 14/694,363

(22) Filed: Apr. 23, 2015

(65) Prior Publication Data

US 2015/0313391 A1    Nov. 5, 2015

Related U.S. Application Data

(60) Provisional application No. 61/987,147, filed on May 1, 2014.

(51) Int. Cl.
*A47G 19/22* (2006.01)
*B29C 70/68* (2006.01)
(Continued)

(52) U.S. Cl.
CPC ........ *B29C 66/131* (2013.01); *A47G 19/2205* (2013.01); *A47G 19/2288* (2013.01);
(Continued)

(58) Field of Classification Search
CPC ... B29C 66/131; B29C 65/08; B29C 45/2618; B29C 45/006; B29C 45/26;
(Continued)

(56) References Cited

U.S. PATENT DOCUMENTS 1,953,723 A    4/1934 Quante
2,580,043 A    12/1951 Paige
(Continued)

OTHER PUBLICATIONS

International Search Report of PCT Application No. PCT/US2015/027890, dated Jul. 30, 2015.
(Continued)

*Primary Examiner* — Philip Tucker
*Assistant Examiner* — Vicki Wu
(74) *Attorney, Agent, or Firm* — Caesar Rivise, PC

(57) ABSTRACT

An insulated drinking vessel, e.g., a wine glass, and methods of making the same is disclosed. The vessel basically comprises a pre-molded inner vessel formed of a plastic material having a sidewall, a pre-molded outer vessel formed of a plastic material, and a ring. The ring is formed of a plastic material and is molded in-situ on a top portion of the inner vessel to cause portions of the plastic material of the inner vessel to melt and intermingle with the plastic material of the ring to form a non-superficial homogenous joint therebetween. The inner vessel is disposed within the outer vessel and the ring is welded to a top portion of the outer vessel. The ring forms the rim or lip of the insulated drinking vessel and that vessel includes an insulating air space between the sidewall portions of the inner and outer vessels.

12 Claims, 2 Drawing Sheets

(51) Int. Cl.
*B29C 70/78* (2006.01)
*B29C 65/08* (2006.01)
*B29C 65/00* (2006.01)
*B29C 45/26* (2006.01)
*B29C 45/00* (2006.01)
B29K 67/00 (2006.01)
B29L 31/00 (2006.01)

(52) U.S. Cl.
CPC ............ *B29C 45/006* (2013.01); *B29C 45/26* (2013.01); *B29C 45/2618* (2013.01); *B29C 65/08* (2013.01); *B29C 66/12445* (2013.01); *B29C 66/12463* (2013.01); *B29C 66/30223* (2013.01); *B29C 66/545* (2013.01); *B29C 66/73921* (2013.01); *A47G 2400/10* (2013.01); *B29C 66/71* (2013.01); *B29K 2067/00* (2013.01); *B29L 2031/7132* (2013.01)

(58) Field of Classification Search
CPC ........ B29C 66/12445; B29C 66/12463; B29C 66/545; B29C 66/71; B29C 66/73921; B29C 66/30223; A47G 19/2288; A47G 19/2205; A47G 2400/10; B29K 2067/00; B29L 2031/7132
USPC ......................................................... 156/242
See application file for complete search history.

(56) References Cited

U.S. PATENT DOCUMENTS

| | | | | |
|---|---|---|---|---|
| 3,247,302 | A * | 4/1966 | Lewis | A47J 41/0077 215/12.1 |
| 3,827,925 | A * | 8/1974 | Lewis et al. | A47J 41/0077 156/73.1 |
| 4,550,849 | A | 11/1985 | Adsit | |
| D289,484 | S | 4/1987 | Forquer et al. | |
| 4,872,569 | A | 10/1989 | Bolte | |
| 5,090,213 | A | 2/1992 | Glassman | |
| 5,553,735 | A | 9/1996 | Kimura | |
| 5,839,599 | A | 11/1998 | Lin | |
| 6,050,443 | A * | 4/2000 | Tung | A47G 19/2227 215/12.1 |
| D449,962 | S | 11/2001 | Harrison et al. | |
| 6,405,892 | B1 | 6/2002 | Volan | |
| 6,419,108 | B1 * | 7/2002 | Toida | A47G 19/2288 220/592.17 |
| 6,921,179 | B2 | 7/2005 | Ghanem | |
| D519,785 | S | 5/2006 | Bodum | |
| D526,848 | S | 8/2006 | Bodum | |
| D557,561 | S | 12/2007 | Flowers et al. | |
| 7,306,113 | B2 | 12/2007 | El-Saden et al. | |
| D614,448 | S | 4/2010 | Cahen | |
| D680,376 | S | 4/2013 | Romley | |
| D693,176 | S | 11/2013 | Kaiser | |
| D698,200 | S | 1/2014 | Lauwagie | |
| 8,684,223 | B1 | 4/2014 | Kalamaras | |
| D720,185 | S | 12/2014 | Kaiser | |
| D742,173 | S | 11/2015 | Perman | |
| D742,177 | S | 11/2015 | Morris, II et al. | |
| D744,280 | S | 12/2015 | Chiang | |
| D758,792 | S | 6/2016 | Karussi | |
| 9,451,842 | B2 * | 9/2016 | Melton | A47G 19/2288 |
| 9,578,981 | B2 * | 2/2017 | Melton | A47G 19/2288 |
| 9,771,205 | B2 * | 9/2017 | Melton | A47G 19/2288 |
| 2003/0029876 | A1 * | 2/2003 | Giraud | A47G 19/2288 220/592.17 |
| 2004/0212120 | A1 | 10/2004 | Giraud | |
| 2005/0045643 | A1 | 3/2005 | Ghanem | |
| 2005/0173044 | A1 | 8/2005 | Drummond et al. | |
| 2005/0173365 | A1 | 8/2005 | McKnight | |
| 2005/0194340 | A1 | 9/2005 | Huang | |
| 2008/0210694 | A1 | 9/2008 | Castonguay | |
| 2013/0175278 | A1 * | 7/2013 | Kah, Jr. | B65D 81/3869 220/592.2 |

OTHER PUBLICATIONS www.BedBathandBeyond.com, Tervis 9 oz. Wine Glass, downloaded on Sep. 26, 2016.

* cited by examiner

INSULATED DOUBLE WALLED DRINKING VESSEL AND METHOD OF MAKING THE SAME

CROSS-REFERENCE TO RELATED APPLICATIONS

This utility application claims the benefit under 35 U.S.C. § 119(e) of Provisional Application Ser. No. 61/987,147 filed on May 1, 2014 entitled Insulated Doubled Walled Drinking Vessel And Method Of Making The Same. The entire disclosure of that provisional application is incorporated by reference herein.

FIELD OF THE INVENTION

This invention relates generally to drinking vessels and more particularly to insulated drinking vessels having a thin rim and methods of making the same.

BACKGROUND OF THE INVENTION

Double walled insulated drinking vessels are commercially available from various vendors. There are also numerous U.S. patents and published patent applications directed to doubled walled insulated drinking vessels, such as glasses, mugs, goblets, wine glasses and the like. See for example, U.S. patents and published applications: U.S. Pat. No. 4,872,569 (Bolte); U.S. Pat. No. 5,090,213 (Glassman); U.S. Pat. No. 5,553,735 (Kimura); U.S. Pat. No. 5,839,599 (Lin); U.S. Pat. No. 6,050,443 (Tung et al.); U.S. Pat. No. 6,405,892 (Volan); U.S. Pat. No. 6,419,108 (Toida et al.); U.S. Pat. No. 6,921,179 (Ghanem); U.S. Pat. No. 7,306,113 (El-Saden et al.); D519,785 (Bodum); D526,848 (Bodum); D557,561(Flowers et al.); 2004/0212120 (Giraud); 2005/0045643 (Ghanem); 2005/0173365 (McKnight); and 2005/0194340 (Huang).

While the insulated drinking vessels of the foregoing prior art may be generally suitable for their intended purposes, a need exists for drinking vessel which has a thin, but relatively long, drinking lip. The subject invention addresses that need by providing an insulated drinking vessel and method of making it.

The drinking vessel is formed of a pre-molded inner vessel having a top portion on which a ring of a plastic material is molded in-situ to produce a non-superficial homogenous joint. The inner vessel is located within an outer vessel, with a top portion of the inner vessel welded to a portion of the ring.

SUMMARY OF THE INVENTION

In accordance with one aspect of this invention an insulated drinking vessel is provided. The insulated drinking vessel comprises an inner vessel, an outer vessel, and a ring. The inner vessel, the outer vessel and the ring are formed a plastic material.

A first one of the inner and outer vessels is pre-molded and includes a top edge portion. A second one of the inner and outer vessels is pre-molded and includes a top edge portion. The ring has a bottom edge and is molded in-situ on the top edge portion of the first one of the inner and outer vessels to cause the plastic material thereof to fuse together and intermingle with the plastic material of the first one of the inner and outer vessels to form a non-superficial homogenous joint at a portion of the bottom edge of the ring. The top edge portion of the second one of the inner and outer vessels is fixedly secured to a portion of the bottom edge of the ring by a weld joint. The ring forms the lip of the drinking vessel.

In accordance with one preferred aspect of this invention the weld joint comprises an annular projection located within an annular recess, e.g., the top edge portion of the second one of the inner and outer vessels comprises the annular projection and a portion of the bottom edge of the ring comprises the annular recess.

In accordance with another preferred aspect of this invention the inner and outer vessels are separated by an insulating air space.

In accordance with another preferred aspect of this invention the ring is thin and relatively long, and may be optionally colored, while the inner and outer vessels are transparent. A decorative item may be located within the insulating air space.

Another aspect of this invention constitutes methods of making an insulated double walled drinking vessel comprising an inner vessel, an outer vessel and a ring. For example, one method of this invention entails making the insulated drinking vessel by providing inner and outer vessels. A first one of the inner and outer vessels is pre-molded of a plastic material and has a top edge portion. A second one of the inner and outer vessels is pre-molded of a plastic material and has a top edge portion. A ring of a plastic material and having a bottom edge is molded in-situ on a portion of the top edge portion of the first one of the inner and outer vessels to cause the plastic material thereof to fuse together and intermingle with the plastic material of the first one of the inner and outer vessels to form a non-superficial homogenous joint at a portion of the bottom edge of the ring. The top edge portion of the second one of the inner and outer vessels is fixedly secured to a portion of the bottom edge of the ring by a weld joint.

DETAILED DESCRIPTION OF THE PREFERRED EMBODIMENT

Figure 1:
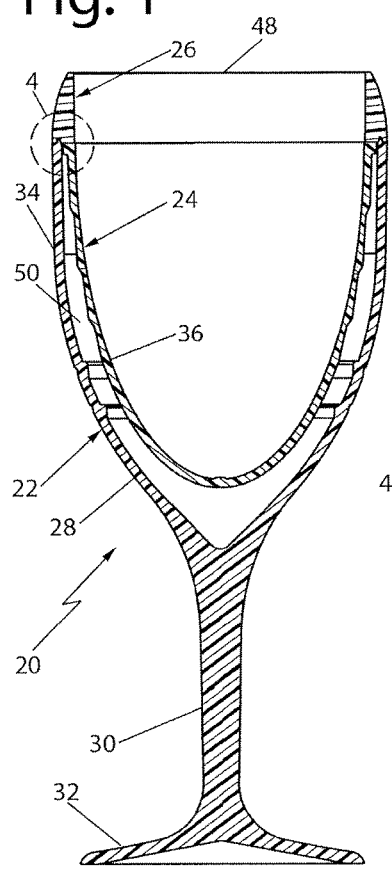
FIG. 1 is vertical sectional view of one exemplary insulated drinking vessel, e.g., a wine glass, constructed in accordance with this invention.

Referring now to the various figures of the drawing wherein like reference characters refer to like parts, there is shown at 20 in FIG. 1 one exemplary embodiment of an insulated drinking vessel, e.g., a stemmed wine glass, constructed in accordance with this invention. The wine glass 20 basically comprises an outer vessel 22, an inner vessel 24, and a ring 26. The outer vessel 22 is an integral unit that is molded of any suitable transparent plastic material, e.g., Eastman Tritan™ copolyester sold by Eastman Chemical Company. Any suitable conventional molding technique, e.g., injection molding, blow molding, etc., can be used to form the outer vessel. What is important is that the outer vessel is a pre-molded component, i.e., is made prior to its use in the assembly of the vessel 20. The inner vessel 24 is also an integral unit that is also pre-molded of any suitable plastic material using any suitable conventional molding technique. In accordance with one preferred aspect of this invention the material making up the inner vessel is the same material as that of the outer vessel, e.g., Eastman Tritan™ copolyester.

The rim or lip of the wine glass 20 is formed by the ring 26. To that end, the ring is molded in-situ on the top surfaces one of the inner and outer vessel in accordance with a method of this invention. In the exemplary embodiment shown, the ring is molded in-situ on the inner vessel in accordance with one method of this invention. That method will be described in detail later. Suffice it for now to state that the pre-molded inner vessel is placed within an injection molding machine or device (not shown), with the top surface of a portion of the inner vessel 24 in communication with a ring shaped mold cavity (not shown) in the injection molding machine. The ring shaped mold cavity is of any suitable thickness and height to form the rim or lip of a drinking vessel, e.g., it may have a thickness in the range of approximately 0.06 inch to 0.20 inch, and a height in the range of approximately 0.06 inch to 1 inch. A molten plastic material, preferably the same material as that from which the outer and inner vessels were pre-molded, is injected under pressure into the mold cavity to fill the ring shaped portion of the cavity and thereby form the ring 26. Moreover, and quite significantly, the molten injected plastic forming the ring 26 also engages the exposed top surface of the inner vessel to cause that surfaces to melt and reflow to a substantial depth, e.g., within the range of approximately 0.003 inch-0.100 inch (preferably within the range of approximately 0.030 inch-0.080) inch, whereupon the injected plastic intermingles with the melted plastic of the inner vessel, to form a non-superficial homogenous joint thereat, thereby integrally joining the inner vessel to the in-situ molded ring.

The resulting molded subassembly or unit of the inner vessel and the ring is then allowed to cool to the point at which it can be removed from the injection molding machine and inserted into a pre-molded outer vessel, so that the inner vessel of the subassembly is located in the bowl portion (to be described later) of the outer vessel, with a top edge portion of the outer vessel abutting a portion of the bottom surface or edge of the ring. That assembly can then be brought to a welding machine, e.g., an ultrasonic welding machine, to weld the ring with the inner vessel to the outer vessel.

The abutting surfaces of the ring and outer vessel at which an ultrasonically welded joint is to be formed are preferably profiled or shaped in such a manner to concentrate the ultrasonic energy thereat to facilitate the formation of a good weld joint. Thus, the abutting surfaces of the ring and outer vessel preferably make use of a conventional interference (e.g., double shear) joint. Alternatively, those surfaces may make use of a triangular protrusion energy director (e.g., an upstanding triangular annular protrusion from one flange surface and an planar surface on the other flange) or any other conventional joints or profiling that are known to those skilled in the art of ultrasonic welding, to create a good ultrasonic weld joint. In the exemplary embodiment shown and which will be described later, the abutting surfaces are in the form of a double shear, e.g., tongue and groove, joint.

Once the assembly of the outer vessel and the ring with its attached inner vessel is located in the ultrasonic welding machine, its horn or sonotrode can be applied to the top edge of the ring to produce a far field weld at the interface of the ring and the outer vessel, thereby completing the vessel 20. The resulting vessel exhibits the same properties as if it had been molded as an integral unit at one time, e.g., it exhibits the same resistance to breakage or other damage at the location of the joints between the ring and the inner and outer vessels as remainder of the unit.

Figure 2:
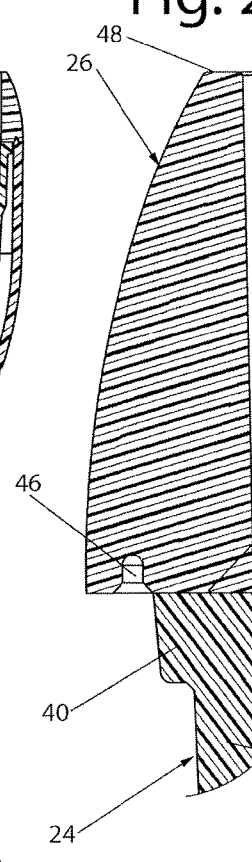
FIG. 2 is an enlarged sectional view of the top portion of the wine glass shown during one step in the making thereof pursuant to a method of this invention.
Figure 3:
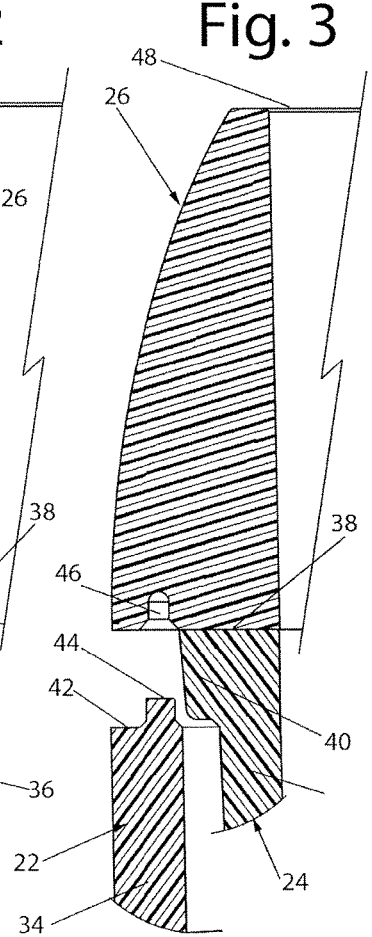
FIG. 3 is an enlarged sectional view, similar to FIG. 2, but showing the top portion of the wine glass at a further step in the method of making the wine glass.
Figure 4:
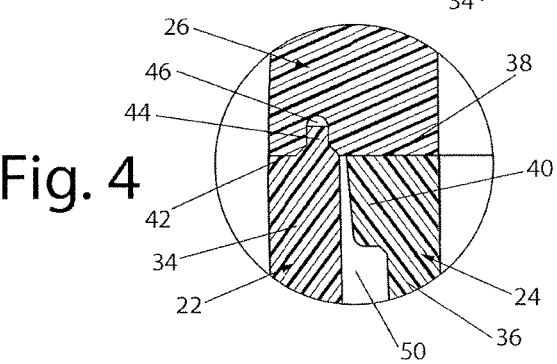
FIG. 4 is an enlarged sectional view of the portion of the wine glass shown within the circle designated as 4 in FIG. 1.

The details of the exemplary wine glass 20 will now be described. Thus, as best seen in FIG. 1, the outer vessel includes a bowl shaped portion 28, a stem 30 and a flanged base 32. The bowl shaped portion 28 has a sidewall 34 that is a surface of revolution and can be of any desired shape. In the exemplary embodiment it is shown as being arcuate. The inner vessel 24 is generally bowl shaped and includes an arcuate sidewall 36. The sidewall 36 is also a surface of revolution and can be of any desired shape. In the exemplary embodiment it is also arcuate. As best seen in FIGS. 2-4, the upper end of the sidewall 36 is in the form of an outwardly directed annular flange 40. The flange 40 has a planar top surface 38. The surface 38 is the surface upon which the ring 26 is molded in-situ, as will be described in detail later.

As mentioned above the abutting surfaces of the ring and outer vessel at which the ultrasonic joint is to be formed are preferably in the form of a double shear, e.g., tongue and groove, interference joint. To that end, as best seen in FIGS. 3 and 4, the top edge or upper surface 42 of the sidewall 34 of the outer vessel 22 includes an annular wall 44 projecting upward therefrom. The annular wall 44 is chamfered at the point where it merges with the top surface 42 and forms the tongue of the tongue and groove joint. The height of the annular walls is preferably within the range of 0.025 inch to 0.050 inch (and most preferably 0.04 inch). The thickness of the annular wall is preferably within the range of 0.025 inch to 0.05 inch (and most preferably 0.040 inch). The annular wall or tongue 44 is arranged to be disposed within a correspondingly shaped groove to form the tongue and groove interference joint. That groove is in the form of an annular recess 46 located in the planar bottom edge or undersurface 42 of the ring 26. The annular recess 46 is correspondingly shaped to the annular wall 44 and includes a chamfered entryway contiguous with the planar undersurface 42.

While not preferable, the tongue and groove interference joint can alternatively be formed by having the annular groove 46 in the top edge of the outer vessel 22 and the annular wall 44 project downward from the undersurface 42 of the ring 26. In fact, as mentioned above the abutting surfaces of the ring and the outer vessel may include other features or profiles to concentrate the ultrasonic welding energy thereat in lieu of the exemplary tongue and groove joint.

The welding of the ring to the outer vessel is accomplished by placing the horn or sonotrode of an ultrasonic welding device onto the top surface 48 of the ring 26 to focus and direct the ultrasonic energy to the engaging surfaces of the annular wall 44 and annular recess 46. Since the ring has a height of up to approximately 1 inch the weld produced is constitutes what could be called a "far-field" weld. During the welding operation, the annular wall 44 melts and flows into the annular recess 46 to form a strong welded joint therebetween, like shown in FIG. 4.

When the ring 26 with the inner vessel 24 is welded to the outer vessel as just described the outer surface of the sidewall 36 of the inner vessel 24 is spaced from the inner surface of the sidewall 34 of the outer vessel 22 to form an insulating air space 50 therebetween. If desired, an optional, decorative item, e.g., a wrap, an embroidered emblem or patch, etc., (not shown) can be disposed in the air space prior to the welding of the components to provide enhanced aesthetics for the vessel 20. Irrespective of the construction of the decorative item, since it is disposed within the air space 50 and the sidewall of the outer vessel 22 is transparent, it will be visible through the transparent sidewall to provide enhanced aesthetics to the insulated vessel 20. Moreover, in the interest of aesthetics, the material forming the ring 26 may be colored to accentuate the rim and to coordinate with the ornamentation provided by the decorative item with in the insulated air space. For example, the decorative item within the air space may be a wrap or embroidered patch bearing a college logo in the college's colors, with the ring being colored to match one of the college's colors for emphasis.

If the insulated vessel is something other than a wine glass, e.g., is a bottle, a helical thread may be provided on the outer surface of the ring 26 to accommodate a threaded cap or lid for the insulated vessel. To that end, the mold cavity in which the ring is molded may include helical thread forming portion contiguous with the portion of the cavity forming the outer surface of the ring. Alternatively, the ring may be formed with an internal helical thread for a cap or lid. In such a case, the mold cavity may include helical thread forming portion contiguous with the portion of the cavity forming the inner surface of the ring. Other features can be molded into the ring during its formation, e.g., the top edge of the ring may include a portion of elevated height to form an enlarged lip for facilitating the drinking of a beverage from the vessel. A straw holder, not shown, may also be formed in the ring as the ring is molded.

Figure 5:
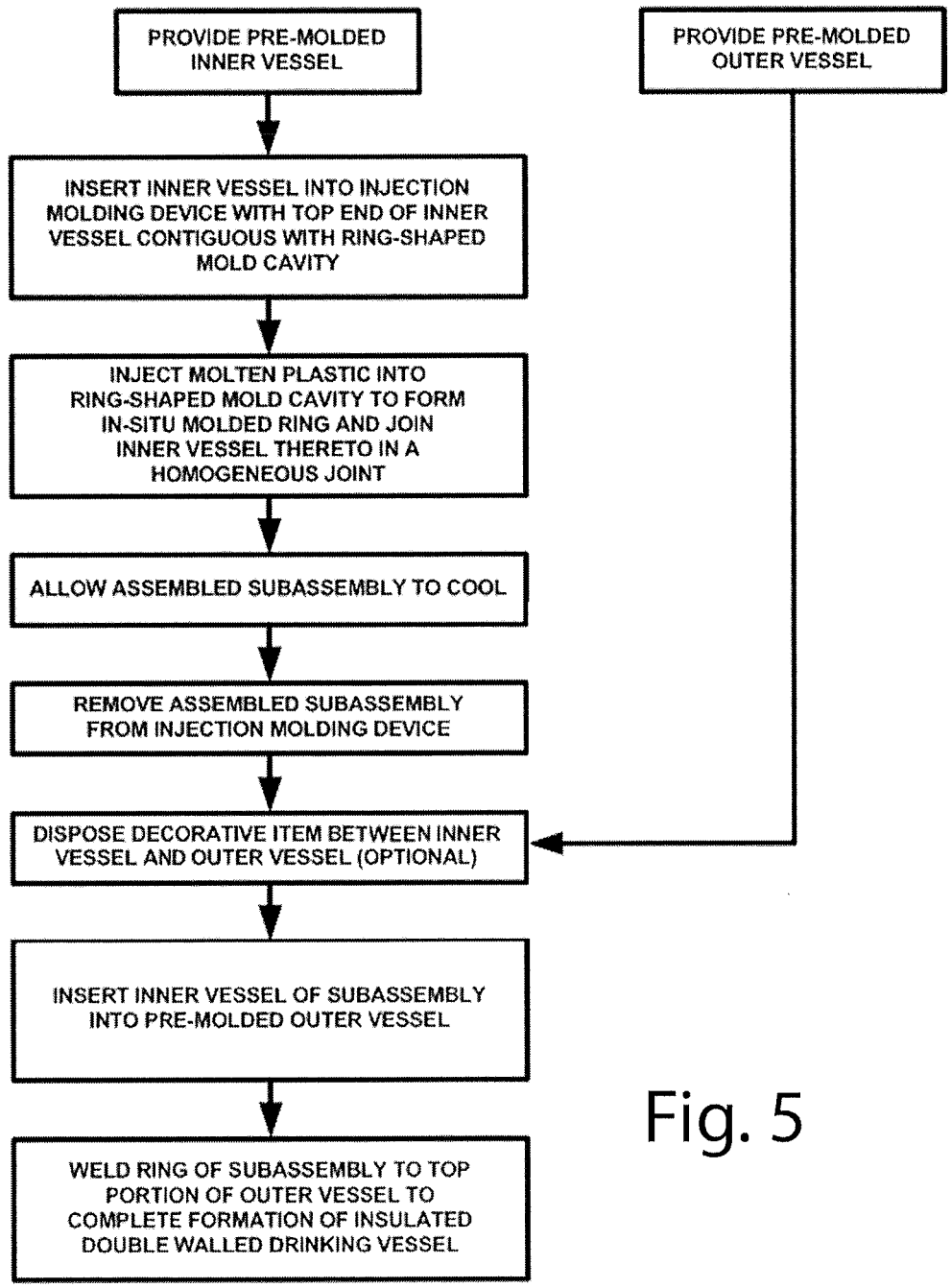
FIG. 5 is a block diagram of one exemplary method in accordance with this invention for making an insulated vessel, such as the wine shown in FIG. 1.

As mentioned above the method of making the insulated wine glass 20 (or any other double walled insulated drinking vessel constructed in accordance with this invention) constitutes another aspect of this invention. To that end, as best seen in FIG. 5, the method entails providing a pre-molded inner vessel formed of a plastic material. That inner vessel is constructed as discussed earlier, e.g., it has a top edge portion and an annular flange. In particular, the inner vessel 24 inserted into an injection molding machine so that it is at the base of the injection molding machine's cavity with its top surface 38 contiguous with the portion of the ring-shaped mold cavity for forming the ring. The geometry of the molding machine cavity is such that a leak proof seal is created inside the inner vessel 24 when the mold is closed. This is accomplished by making the portion of the cavity that the inner vessel is nested in of a smaller diameter by at least 0.004 inch than the inner diameter of the portion of the cavity forming the inner surface of the ring. Moreover, it is desirable to have the mold cavity produce a land length of at least 0.060 inch.

The ring 26 is then molded in-situ on the top edge 38 of the pre-molded inner vessel, whereupon the heat and pressure applied causes the plastic material forming the ring to fuse together and intermingle with the re-flow (melted) plastic material of the inner vessel to form a non-superficial homogenous joint and with the ring having an inner surface that is flush with the inner surface of the inner vessel. Moreover, the gating of the ring should be placed in such a way as to give maximum heat to the re-flow area. Thus, it is preferably located as close to the inner re-flow area as possible. The parameters of the injection molding process are set in a way to create enough shear heat to re-flow the top surface of the inner vessel to form the non-superficial homogeneous joint. For example, in accordance with one exemplary process of this invention, barrel heats are set to a range between 530-560 degrees F. and pack and hold cavity pressures are between approximately 10,000 PSI to 12,000 PSI.

After the in-situ molding process is complete, the assembled unit or subassembly of the ring and inner vessel is allowed to cool within the injection molding machine until the molten plastic has solidified sufficiently that the subassembly can be removed to be welded to the outer vessel. To that end, the inner vessel 24 of the subassembly is placed within the interior of the bowl shaped portion 28 of the outer vessel, such that the annular wall 44 of the outer vessel is juxtaposed opposite the annular groove 46 in the undersurface 42 of the ring 26 as shown in FIG. 3. Those surfaces can then be brought into abutment with each other with the sonotrode of the ultrasonic welding machine engaging the top free edge or surface 48 of the ring 26 to apply pressure thereto and to focus and direct ultrasonic energy therefrom through the height of the ring to the engaging surfaces of the annular wall 44 and annular recess 46, to cause those surface to melt and fuse to form a good joint like shown in FIG. 4. That action completes the vessel 20. Another vessel can then be made in a similar manner as just described.

It should be pointed out at this juncture that the structure of the insulated drinking vessel and method or making it as described above are merely exemplary of various structures and methods that are contemplated by this invention. Thus, for example, the insulated vessel 20 of this invention is not limited to wine glasses or goblets. To that end the insulated vessels may be in the form of tumblers, mugs, bottles, etc. Moreover, the sidewall portions of the vessels may be of other shapes and sizes than that shown in the drawing. What is important is that the upper rim of the vessel is molded in-situ on the pre-molded inner vessel and the resulting subassembly welded within an outer vessel to produce a thin upper lip or rim formed of a single sidewall, while a substantial portion of the remainder of the insulated vessel below the ring is insulated via a double wall construction.

Without further elaboration the foregoing will so fully illustrate our invention that others may, by applying current or future knowledge, adopt the same for use under various conditions of service.

We claim:

1. A method for making an insulated drinking vessel comprising:
    a) providing inner and outer vessels, a first one of said inner and outer vessels being pre-molded of a plastic material and having a top edge portion, a second one of said inner and outer vessels being pre-molded of a plastic material and having a top edge portion;
    b) molding a ring of a plastic material in-situ on a portion of said top edge portion of said first one of said inner and outer vessels to cause the plastic material of said ring to fuse together and intermingle with said plastic material of said first one of said inner and outer vessels to form a non-superficial homogenous joint at a bottom edge portion of said ring;
    c) fixedly securing said top edge portion of said second one of said inner and outer vessels to a bottom edge portion of said ring by a weld joint.

2. The method of claim 1 wherein said plastic material of said inner vessel, said outer vessel and said ring is the same plastic material.

3. The method of claim 2 wherein said plastic material comprises copolyester.

4. The method of claim 1 wherein said weld joint comprises an annular projection located within an annular recess.

5. The method of claim 4 wherein said top edge portion of said second one of said inner and outer vessels comprises said annular projection and wherein a portion of said bottom edge portion of said ring comprises said annular recess.

6. The method of claim 1 wherein said inner vessel, said outer vessel and said ring are transparent.

7. The method of claim 1 wherein said inner vessel and said outer vessel are transparent and wherein said ring is colored.

8. The method of claim 1 wherein said ring includes a top free edge, and wherein the thickness of said ring tapers downward in thickness in a direction from said inner and outer vessels toward said top free edge.

9. The method of claim 1 wherein said ring is threaded to accommodate a lid for said insulated drinking vessel.

10. The method of claim 1 wherein said inner vessel includes a sidewall and wherein said outer vessel comprises a sidewall, and wherein portions of said sidewall of said inner vessel are spaced from portions of said sidewall of said outer vessel to form an insulating air space therebetween when said inner vessel is disposed within said outer vessel.

11. The method of claim 10 additionally comprising disposing a decorative item within said insulating air space.

12. The method of claim 1 wherein said weld joint comprises a far-field ultrasonically welded joint.

\* \* \* \* \*